United States Patent
Anglin

(10) Patent No.: US 8,185,498 B2
(45) Date of Patent: May 22, 2012

(54) DATA DEDUPLICATION BY SEPARATING DATA FROM META DATA

(75) Inventor: Matthew J. Anglin, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/246,592

(22) Filed: Sep. 27, 2011

(65) Prior Publication Data

US 2012/0016846 A1    Jan. 19, 2012

Related U.S. Application Data

(63) Continuation of application No. 13/088,875, filed on Apr. 18, 2011, now Pat. No. 8,055,618, which is a continuation of application No. 11/966,460, filed on Dec. 28, 2007, now Pat. No. 7,962,452.

(51) Int. Cl.
*G06F 17/00* (2006.01)
(52) U.S. Cl. ......... 707/634; 707/638; 707/791; 707/792
(58) Field of Classification Search .................. 707/634, 707/738, 791, 792
See application file for complete search history.

(56) References Cited

U.S. PATENT DOCUMENTS

| | | | |
|---|---|---|---|
| 7,043,637 B2 | 5/2006 | Bolosky et al. | |
| 7,092,956 B2 | 8/2006 | Ruediger | |
| 7,200,604 B2 | 4/2007 | Forman et al. | |
| 2004/0187075 A1 | 9/2004 | Maxham et al. | |
| 2005/0066190 A1 | 3/2005 | Martin | |
| 2005/0203864 A1 | 9/2005 | Schmidt et al. | |
| 2005/0246376 A1 | 11/2005 | Lu et al. | |
| 2006/0015535 A1 | 1/2006 | Buchsbaum et al. | |
| 2006/0020646 A1 | 1/2006 | Tee et al. | |
| 2006/0224846 A1 | 10/2006 | Amarendran et al. | |
| 2006/0282475 A1 | 12/2006 | Suermondt et al. | |
| 2007/0069023 A1 | 3/2007 | Jones et al. | |
| 2008/0133561 A1 * | 6/2008 | Dubnicki et al. | 707/101 |
| 2011/0196848 A1 | 8/2011 | Anglin | |

OTHER PUBLICATIONS

C.A.N. Soules, et al., "Metadata Efficiency in Versioning File Systems", USENIX Association, Proceedings of FAST '03: 2nd USENIX Conference on File and Storage Technologies, San Francisco, CA, Mar. 31-Apr. 2, 2003, 17 pgs.

"Sun StorEdge QFS and SAM-FS Software", Sun Microsystems, Technical Overview, Mar. 2004, 36 pgs.

First Office Action for U.S. Appl. No. 11/966,460, dated Mar. 3, 2010, 10 pgs.

Final Office Action for U.S. Appl. No. 11/966,460, dated Aug. 11, 2010, 12 pgs.

(Continued)

*Primary Examiner* — Sana Al Hashemi
(74) *Attorney, Agent, or Firm* — Janaki K. Davda; Konrad Raynes and Victor LLP

(57) ABSTRACT

Provided are techniques for data deduplication. A chunk of data and a mapping of boundaries between file data and meta data in the chunk of data are received. The mapping is used to split the chunk of data into a file data stream and a meta data stream and to store file data from the file data stream in a first file and to store meta data from the meta data stream in a second file, wherein the first file and the second file are separate files. The file data in the first file is deduplicated.

15 Claims, 8 Drawing Sheets

OTHER PUBLICATIONS

Notice of Allowance for U.S. Appl. No. 11/966,460, dated Feb. 8, 2011, 8 pgs.

Response to First Office Action for U.S. Appl. No. 11/966,460, dated Jun. 3, 2010, 11 pgs.

Response to Final Office Action for U.S. Appl. No. 11/966,460, dated Nov. 10, 2010, 12 pgs.

Notice of Allowance for U.S. Appl. No. 13/088,875, dated Jul. 1, 2011, 12 pgs.

* cited by examiner

```
/*
 * Normally, numBytes is the amount of data to read (say 256k).
 *
 * The routine UpdateMetaInfo reads the next header from the meta data
 * file and updates the variables "nextMetaOffset" and "nextMetaLength".
 * Actually, it is a little more intelligent than that. It actually checks
 * the current values of the 2 variables, and determines whether it needs
 * to read from the meta data file or not.
 */
UpdateMetaInfo( );
while( numBytes > 0 && rc == 0 )
{
   bytesToNextMeta = nextMetaOffset - currentFilePosition;

if ( bytesToNextMeta == 0 )
   {
      /*
       * Read meta data.
       */
      bytesToRead = min( nextMetaLength, numBytes );
      bytesRead = 0;
      rc = DoRead( dataBufP, bytesToRead, &bytesRead, typeMetaData );

if ( rc != 0 || bytesRead != bytesToRead )
      {
         /* Error - return */
         continue;
      } dataBufP        += bytesRead;
      numBytes        -= bytesRead;
      *bytesReadP     += bytesRead;
      nextMetaOffset  += bytesRead;
      nextMetaLength  -= bytesRead;
      UpdateMetaInfo( );  /* Update the meta data, if necessary */
   }
   else
   {
      /*
       * Read file data
       */
      bytesToRead = min( bytesToNextMeta, numBytes );
      bytesRead = 0;
      rc = DoRead( dataBufP, bytesToRead, &bytesRead, typeFileData );

if ( rc != 0 || bytesRead != bytesToRead )
      {
         rc = -1;
         continue;
      } dataBufP    += bytesRead;
      numBytes    -= bytesRead;
      *bytesReadP += bytesRead;
   }
}
```

```
static int UpdateMetaInfo( StnetVolDesc *volP, char *volNameP )
{
    int         rc;
    MyMetaDesc       metaDesc;
    int32_t     metaLen, bytesRead;
    int64_t     metaFileSize;
    const int64    metaDescSize = sizeof( MyMetaDesc );
    /* Get size of meta data file to prevent reading past EOF */
    rc = GetFileSize( metaFile, &metaFileSize );
    /*
     * Check to see if there is a need to prime the meta data fields.
     * If both fields are -1, then they were not previously set.
     * If the offset is -1 and the length is 0, then there is no
     * more meta data.
     */
    if ( ( ( nextMetaOffset == -1 && nextMetaLength == -1 ) ||
         ( nextMetaLength == 0   && nextMetaOffset == -1 ) )
    {
        /*
         * Need to open up the meta File and read in a descriptor. Of course,
         * do not want to read past EOF, so need to check for that.
         */
        if ( metaFileSize - currentMetaPosition >= metaDescSize )
        {
            bytesRead = 0;
            rc = DoRead( (char *)&metaDesc, sizeof( metaDesc ), &bytesRead,
typeMetaData );
            if ( rc != 0 || bytesRead != sizeof( metaDesc ) )
            {
                rc = ERROR;
            }
            else
            {
                if ( metaDesc.version == MY_META_VERSION )
                {
                    nextMetaOffset = metaDesc.offset;
                    nextMetaLength = metaDesc.length;
                }
                else
                {
                    rc = ERROR;
                }
            }
        }
        else
        {
            /*
             * There is no more meta data in this file.
             */
            nextMetaOffset = -1;
            nextMetaLength = 0;
        }
    }
    return rc;
}
```

DATA DEDUPLICATION BY SEPARATING DATA FROM META DATA

CROSS-REFERENCE TO RELATED APPLICATIONS

This application is a continuation of and claims the benefit of U.S. application Ser. No. 13/088,875, filed Apr. 18, 2011, which is a continuation of and claims the benefit of U.S. application Ser. No. 11/966,460, filed Dec. 28, 2007, the entire contents of each of which is incorporated herein by reference.

BACKGROUND

1. Field

Embodiments of the invention relate to improving data deduplication by separating data from meta data.

2. Description of the Related Art

Storage management products store client data onto disk and/or tapes for backup purposes. This data can be stored without meta data to describe the data, but, to help guarantee data integrity, storage management software may also store its own meta data co-mingled with the file data. This added meta data helps detect tape processing errors (not detected by the drive itself) and allows further integrity by, for example, calculating Cyclic Redundancy Check (CRC) values on subsets of data, and storing the CRC values in the meta data. A cyclic redundancy check (CRC) may be described as a function that takes as input a data stream of any length and produces as output a value of a certain fixed size.

In order to help guarantee integrity, the meta data co-mingled with the client data may also contain other header information used to identify the source of the data (e.g., which client the data came from, name of a file, etc). When stored on disk or tape media, this meta data helps guarantee that the original data is returned to the client when the original data is recovered from the disk or tape media.

In most cases, this co-mingling of data with meta data is very useful to help guarantee the identity and correctness of the data stored within a storage management system. When a file is backed up to a storage management system, the file is generally embedded in other larger data structures on disk or tape. The file may then be copied from disk to tape for redundancy. Finally, to restore your file, the storage management system finds the original data making up the file and sends that data back from the storage management system to a storage management client to put back on a workstation. So, a storage management system may be described as including disk and tape volumes onto which data is stored, and, possibly a database used to track the location of data within the disk and tape volumes. Furthermore, it is common for many files from the same client or for data from different client files to be stored back-to-back on a single piece of media. For example, with common tape capacities well over 500 GigaBytes (500 GB), it may take thousands of client files to fill a single tape. This increases the need for accurate and unique meta data to describe the client data.

Data deduplication describes a scenario in which common data is reduced to a single copy and redundant copies are replaced with pointers to the original copy. For example, a first file includes chunks (e.g., extents) x-z, which are stored. If a second file is divided into chunks (e.g., extents) a-h and chunks b and e (out of chunks a-h) are redundant (i.e., the same as chunks y and z in the first file), then chunks b and e are not stored again. Instead, pointers to y and z are stored. Thus, with data deduplication, redundant chunks are stored once.

Data deduplication can happen at file boundaries or sub-file boundaries with fingerprinting techniques available as prior art (e.g., a Rabin fingerprinting scheme may be described as a specific technique that produces sub-file boundaries of various lengths). In particular, data is broken down into chunks, and each chunk is given a unique signature. One example of a signature is a Secure Hash Algorithm. A SHA-1 digest (one version of the Secure Hash Algorithm) takes a chunk of data and digests it into a single 160-bit value. Variations on chunk size and the number of objects determine the relative possibility of a "false-positive" digest match.

Fingerprinting may be described as the process of looking at a sequence of bytes of arbitrary size and calculating a signature over a small window of those bytes. For example, assume that this window is 64-bytes. In this example, fingerprinting starts at offset 0 in the sequence, takes the first 64-bytes, and generates a signature. This value is logically "ANDed" with a mask to yield the low-order "n" bits of the signature. If this residual value matches a pre-determined search value, then it is determined that this data is significant, and a chunk of data is defined at this boundary. If the residual value does not match the search value, fingerprinting moves the window one byte and repeats the process (bytes 2-65, this time, 3-66 the time after that, etc). The goal of fingerprinting is to break up a large piece of data into smaller chunks, where each chunk is then checked for redundancy. Based on mathematical probability, the average size of the chunks for completely random data will be $2^n$, where "n" is the number of bits in the mask previously mentioned. Thus, to make the average chunk size larger, more bits are used in the mask and more bits in the search value. The larger the chunk size, the fewer number of chunks that are to be managed, but the less likely mostly-common data will match. Likewise, the smaller the chunk size, the more it is likely that matches will be found, but there are more chunks to be managed.

Most common data deduplication techniques use a fingerprinting scheme to break data into smaller chunks and then calculate a digest against the chunk to determine if it has been seen before. In order to deduplicate data, most schemes:

1. Track the digest value of each chunk so as new data is chunked and digested, a determination can be made to check for redundancy
2. Track the various chunks of each piece of data being tracked in the system, so that when the data is requested by its owner, the chunks can be reconstructed into the original order and returned to the owner.

If a Storage Management System is storing its data into a deduplication system, the insertion of the meta data by the Storage Management System will greatly reduce the efficiency of the deduplication. The reason is that the meta data is distributed throughout the client file data and, thereby, reduces the likelihood of having common chunks. For example, two identical files of size 1 Megabyte (M) may not deduplicate much at all once the meta data is factored in. So, to increase deduplication characteristics, it is useful to not store the meta data with the file data, but not storing the meta data with the file data defeats the purpose of using meta data in the first place.

Alternatively, it is possible to separate the meta data from the file data and track the chunks independently. For example, if the Storage Management System were to separate file data from meta data, the Storage Management System may create a rudimentary database table that tracks each chunk and whether that chunk is file data. For example, each row in the table may have the following information:
Chunk id
Chunk digest value (for determining duplicates)
Chunk Type (meta data or file data)
Chunk Length
Chunk Location (where is the data stored)

The idea is that each chunk, be it meta data or file data, is in the table, and the chunk id determines the order used to reconstruct the original data to send back.

The problem with this solution, however, is that the meta data chunks artificially segment the file data at undesired chunk boundaries. For example, assume that there are two 100M objects, and the second object is identical to the first object, with the exception of 10 different bytes at offset 100. If the meta data is inserted at discreet intervals, say every 128 kilobytes (128K), then this file will be chunked according to the fingerprinting technique, but also at meta data locations (i.e., every 128K in this example). In this example, assuming the first chunk consumes up to bytes 110, the first chunk will not match. But the data immediately before and after the 128K of meta data will be identical, so the remaining file data will be considered duplicate. However, instead of just changing those 10 bytes at offset 100, assume that some number of bytes are inserted or removed (a more likely scenario). Now the data immediately before and after the meta data chunks will not be the same, so the data will not be considered duplicate. As a result, an insertion of simply one byte will cause the entire 100M to not match. Actually, the fingerprinting technique may find common data within a 128K section of each file (remember, the file data is segmented by the meta data), and this data will be deduplicated. But, if the chunk size average is 128K or higher, then this becomes less likely.

Thus, there is a need in the art for improved data deduplication with embedded meta data.

SUMMARY OF EMBODIMENTS OF THE INVENTION

Provided are a method, computer program product, and system for data deduplication. A chunk of data and a mapping of boundaries between file data and meta data in the chunk of data are received. The mapping is used to split the chunk of data into a file data stream and a meta data stream and to store file data from the file data stream in a first file and to store meta data from the meta data stream in a second file, wherein the first file and the second file are separate files. The file data in the first file is deduplicated.

BRIEF DESCRIPTION OF THE DRAWINGS

Referring now to the drawings in which like reference numbers represent corresponding parts throughout:

FIG. 6 illustrates pseudocode for retrieving data in accordance with certain embodiments.

FIG. 7 illustrates pseudocode for global functions UpdateMetaInfo, nextMetaOffset, and nextMetaLength in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments physically separate meta data from file data, so that the file data can be deduplicated as a large continuous stream of bytes, thereby, maximizing deduplication efficiency. Embodiments create a meta data file to keep meta data separate from file data and keep a reconstruction structure (for deduplicated objects) of file-data chunks. The meta data file contains information about where the meta data fits into the file data so that the meta data can be re-inserted into the file data during data retrieval. In addition, the file data is no longer segmented by the meta data or by meta data boundaries. With certain embodiments, the information used when writing the data to disk is a breakout of what is meta data and what is file data.

Figure 1:
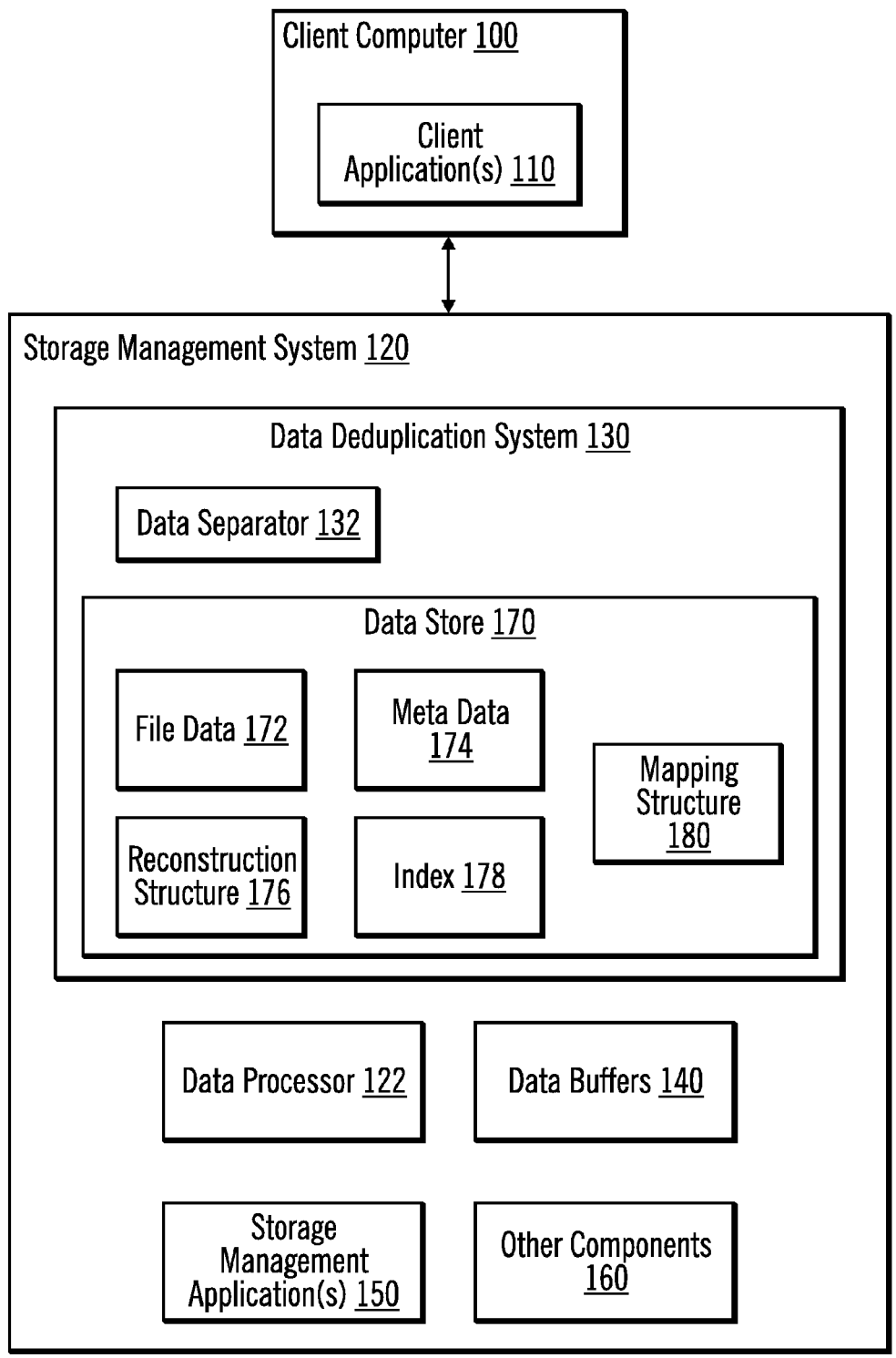
FIG. 1 illustrates details of a computing environment in accordance with certain embodiments.

FIG. 1 illustrates details of a computing environment in accordance with certain embodiments. A client computer 100 is connected ("coupled") via a communication path to a storage management system 120. The client computer 100 includes one or more client applications 110.

The storage management system 120 includes a data processor 122, a data deduplication system 130, one or more storage management applications 150, and other components 160. The data processor 122 adds meta data to file data. Without data deduplication, the data processor 122 stores the data directly to disk, tape, or optical media. With data deduplication, the data is sent to the data deduplication system 130, which stores the data in data store 170. In certain embodiments, the data store 170 represents disk media. The data deduplication system 130 includes a data separator 132 that separates meta data from file data. In alternative embodiments, the data separator 132 is separate from the data deduplication system 130. The storage management system 120 also includes data buffers 140 for storing a stream of data as the data is received from clients (e.g., client applications 110) and for storing a stream of data as the data is received back from the data deduplication system 130.

The data deduplication system 130 includes a data store 170. The data store 170 stores file data 172 and meta data 174 separately. In various embodiments, the data store 170 is inside or tightly coupled to the data deduplication system 130. In other words, the data processor 122 hands data to the data deduplication system 130, and the data deduplication system 130 then stores the data onto the data store 170 in two different streams (a meta data stream and a file data stream). The data store 170 also stores a reconstruction structure 176. In certain embodiments, the reconstruction structure 176 is a reconstruction table that includes a column for file names and a column for chunks of files and locations of those chunks. The locations may be physical locations of the file data 172 in the data store 170.

| Reconstruction Table | |
|---|---|
| File Name | List of chunks/Locations |
| File A | ChunkA - location<br>ChunkB - location<br>ChunkC - location |

Embodiments provide a technique for associating (e.g., either name-based or via a table lookup) the separated meta data with file data (e.g., there are 1000 files, and embodiments enable finding which meta data is associated with file 999). In certain embodiments, the data store may store an index 178 that provides, for each file, an association to stored meta data. In certain other embodiments, the meta data 174 includes an association to related file data 172. For example, in certain embodiments in which there is control over the names of files being stored, for a file "A" that is stored, a separate file "A_M" is created that indicates this is the meta data for file "A". In certain other embodiments, in where there is not control over the names of files being stored, random names are created for the meta data files and a table (e.g., index 178) is used to connect the meta data to the file data.

The data store 170 also stores a mapping structure 180 that indicates correlation of meta data and file data in a chunk of data.

Embodiments split meta data from file data so that file data can be efficiently chunked/deduplicated. With the chunking/deduplication, reconstruction occurs. In addition, in order to send the data back to the storage management system 120, the data deduplication system 130 performs reconstruction at two levels. First, since meta data was separated from the file data when the data was stored, the meta data is re-inserted into the file data stream at the appropriate locations. But the file data stream may have been deduplicated, so embodiments reconstruct the file data stream, too (i.e., by using common deduplication reconstruction techniques). A common deduplication reconstruction technique is to send back the chunks as indicated in the reconstruction table 176. In other words, if file A was chunked into A1, A2, and A3, and A2 was removed as redundant with B1, then, to reconstruct the file, embodiments send chunks A1, B1, and A3 to the client application 110. In this manner, the reconstruction happens at two levels. First the file data stream may need to be reconstructed to obtain all the file chunks. Then, the meta data is re-inserted at the appropriate locations in the file data stream.

The client computer 100 and storage management system 120 may comprise any computing device known in the art, such as a server, mainframe, workstation, personal computer, hand held computer, laptop telephony device, network appliance, etc.

The communication path may comprise, for example, any type of network, such as, a peer-to-peer network, spoke and hub network, Storage Area Network (SAN), a Local Area Network (LAN), Wide Area Network (WAN), the Internet, an Intranet, etc.

The data store 170 may comprise an array of storage devices, such as Direct Access Storage Devices (DASDs), Just a Bunch of Disks (JBOD), Redundant Array of Independent Disks (RAID), virtualization device, etc.

Figure 2:
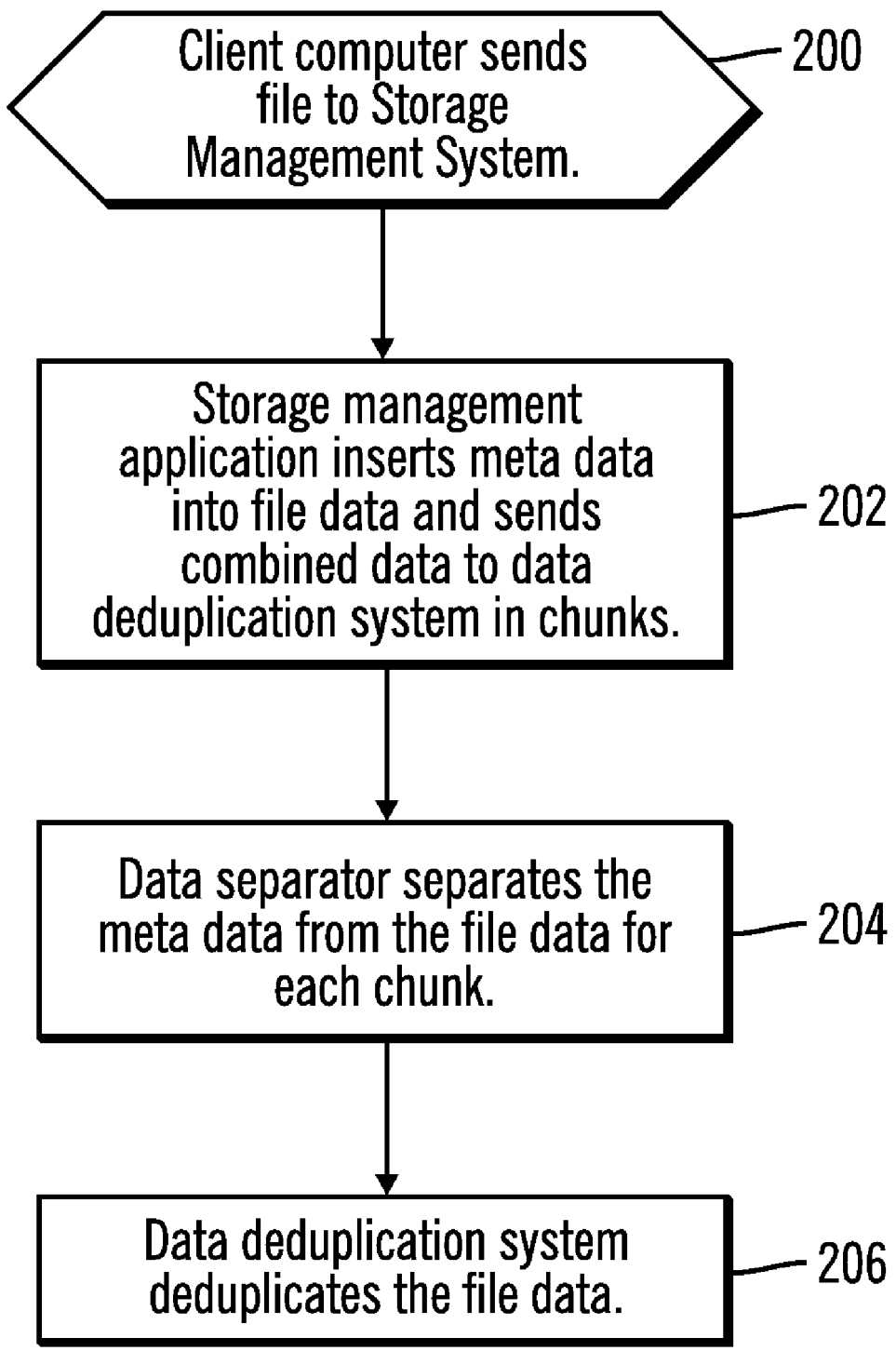
FIG. 2 illustrates logic for storing data in accordance with certain embodiments.

FIG. 2 illustrates logic for storing data in accordance with certain embodiments. Control begins at block 200 with a client application 110 at the client computer 100 sending data to the storage management server 120 for storage. In block 202, the data processor 122 at the storage management system 120 inserts meta data into the file data and sends the combined data to the data deduplication system 130 in chunks. The data processor 122 tells the data deduplication system 130 the boundaries of where the meta data and file data are within the chunk (e.g., using a mapping structure 180), so that the data deduplication system 130 can effectively split the meta data and file data apart. In block 204, the data separator 132 separates the meta data from the file data for each chunk. In block 206, the data deduplication system 130 deduplicates the file data.

Figure 3:
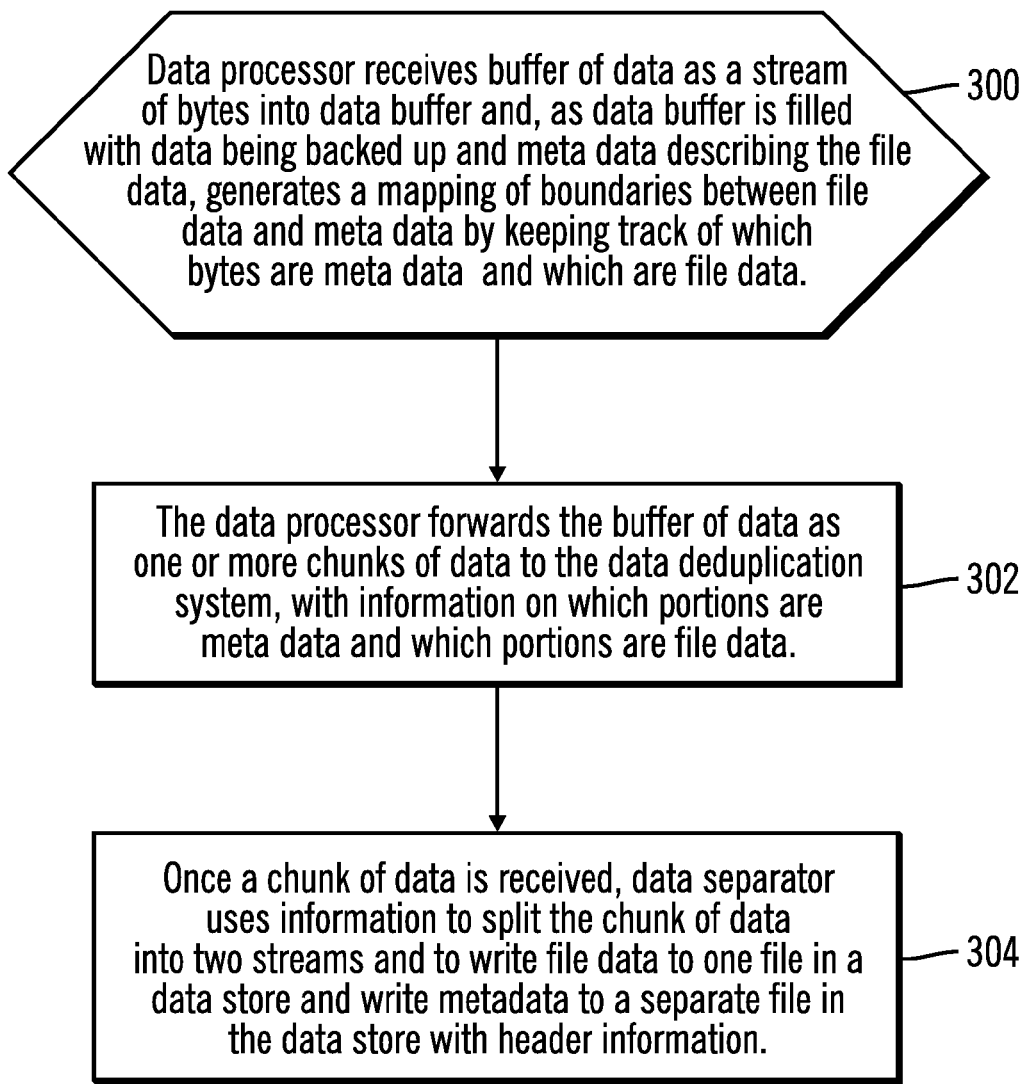
FIG. 3 illustrates logic for separating file data and meta data in accordance with certain embodiments.

FIG. 3 illustrates logic for separating file data and meta data in accordance with certain embodiments. Control begins at block 300 with the data processor 122 receiving a buffer of data (e.g., as a stream of bytes) into a data buffer 140 (e.g., 256K at a time), and, as the data buffer 140 is filled with the data, the data processor 122 generates a mapping of boundaries between file data and meta data by keeping track of which portions (e.g., bytes) of the data are meta data and which are file data. The buffer of data represents data being backed up, which includes file data and meta data describing the file data. In block 302, the data processor 122 forwards the buffer of data as one or more chunks of data to the data deduplication system 130, with information on which portions (e.g., bytes) are meta data and which portions (e.g., bytes) are file data (i.e., the data processor 122 provides boundaries of where the meta data and file data are within the chunk). The information may be in the form of a mapping structure 180. In block 304, once the portions (e.g., bytes) of a chunk of data has been received, the data separator 132 uses the information on which portions are meta data and which portions are file data to split the chunk of data into two streams, one for the file data 172 and one for meta data 174. In this manner, the data separator 132 writes the file data to one file in the data store 170 and writes the meta data 174 to a separate file in the data store 170 with header information.

Figure 4:
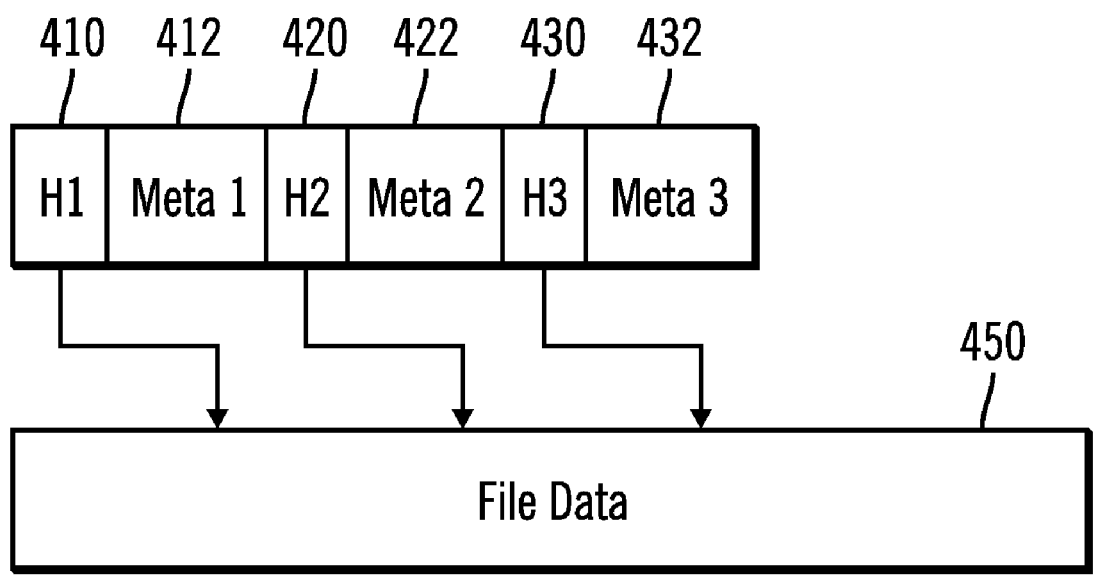
FIG. 4 illustrates an example in which meta data is stored with header information in accordance with certain embodiments.

FIG. 4 illustrates an example in which meta data is stored with header information in accordance with certain embodiments. In particular, when the meta data is written, before each piece of meta data, the following header information is written:

```
typedef struct__myMetaData
{
    uint32_t   version;
    int64_t    offset;
    int64_t    length;
} MyMetaDesc;
#define MY__META__VERSION 1
```

The version is placed into the header to enable dynamically changing the size of the header in the future, while allowing older versions of header information to be read. The offset represents the location of the meta data in the file data stream. In other words, the offset indicates where to insert this meta data into the file data stream when retrieving this data. The length represents the length of the meta data.

In FIG. 4, the H1 410 header information precedes the Meta1 412 meta data. Also, the H2 420 header information precedes the Meta2 422 meta data. The H3 430 header information precedes the Meta3 432 meta data. The header information (H1, H2, H3) indicates the position in the file data 450 at which corresponding meta data is to be inserted. In certain alternative embodiments, the data separator 132 tracks the meta data as an insertion item with the offset and length information in a separate structure (e.g., a database table), and the meta data stream is a separate stream, but the "Hn" header information is stored in yet another place.

Merely to enhance understanding, examples are provided below. It is to be understood that embodiments are not limited to such examples.

In one example, a client application 110 is writing 4 G (4 gigabytes) of data to a logical storage management system volume (e.g., a tape volume or a virtual tape device that writes files to a file system of device type FILE. In conventional systems, a single file in a file system is opened, the 4 G (e.g., 256K at a time) is written into this file, and the file is closed. In such conventional systems, the meta data is co-mingled with the file data.

With embodiments, for each chunk (e.g., 256K) written, a mapping is applied, and mapping may be described as a layout of a specific chunk (e.g., 256K) of data. For example, the mapping might be:

Meta data at offset 0 for 1000 bytes.
File data at offset 1000 for 200,000 bytes.
Meta data at offset 201,000 for 1000 bytes.
File data at offset 202,000 for 54,000 bytes (note that this is rounded, and 256K is 262144 bytes).

This is the mapping in a mapping structure 180 that the data separator 122 uses to split the chunk into meta data and file data streams. As the data buffer 140 is filled with file data being backed up and meta data describing the file data, the data processor 122 keeps track of which bytes in the 256K block are meta data and which are file data. The data processor 122 uses this information to create the mapping in the mapping structure 180. Then, when the 256K is written to the data deduplication system 130, the data separator 132 uses the mapping to split the data into two streams and to write the file data to one file in the file system and write the meta data to a separate file in the file system. Then, the data deduplication system 130 deduplicates the file data, but not the meta data (which is typically unique and small in comparison to the file data). In this manner, the file data is deduplicated more efficiently than in conventional systems.

Figure 5:
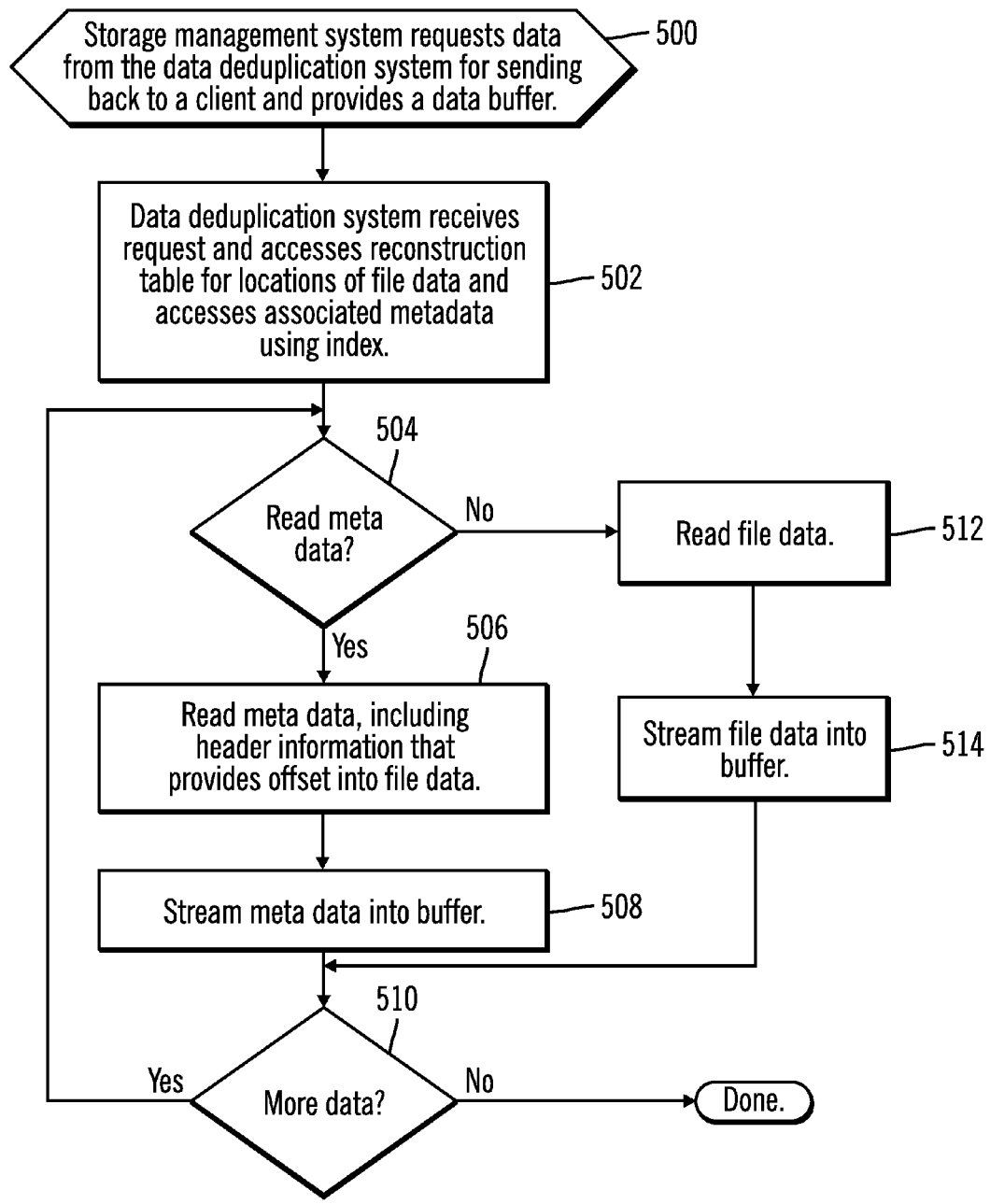
FIG. 5 illustrates logic for recreating a file by combining file data and meta data from separate files in accordance with certain embodiments.

FIG. 5 illustrates logic for recreating a file by combining file data and meta data from separate files in accordance with certain embodiments. Control begins at block 500 with the storage management system 120 requesting data from the data deduplication system 130 for sending back to a client (e.g., client application 110) and providing a data buffer 140. The data deduplication system 130 streams file data and meta data into the provided data buffer 140. So, the storage management system 120 starts the process by asking the data deduplication system for the first chunk (e.g., 256K) of the data previously stored. In block 502, the data deduplication system 130 receives the request and accesses a reconstruction structure 176 for locations of file data and accesses associated meta data using an index 178. As file data is retrieved from the file stream, the reconstruction structure 176 is used to put together the chunks of the file stream that were previously deduplicated. In block 504, the data deduplication system 130 determines whether to read meta data. In certain embodiments, the determination of whether to read meta data or file data is based on the header information in the meta. If so, processing continues to block 506, otherwise, file data is to be read and processing continues to block 512.

In block 506, the data deduplication system 130 reads meta data, including header information that provides an offset into the file data at which the meta data is to be inserted. In block 508, the data deduplication system 130 streams the read meta data into a data buffer 140.

In block 510, the data deduplication system 130 determines whether there is more data (file data or meta data) to be processed. If so, processing loops back to block 504, otherwise, processing is done.

In block 512, the data deduplication system 130 reads file data. In particular, in block 512, the data deduplication system 130 uses the reconstruction structure 176 to re-assemble the file data that had been previously deduplicated. In block 514, the data deduplication system 130 streams the read file data into a data buffer 140. Thus, embodiments, alternate between reading meta data and file data until all data in the original file has been retrieved.

As an example, the storage management system 120 provides the data deduplication system 130 with a data buffer of 256K (i.e., 262,144 bytes). The data deduplication system 130 then alternates between the meta data stream and file data stream to fill this data buffer 140. So, if the first 1000 bytes of the object are meta data (according to the H1 header), then the data deduplication system reads 1000 bytes of the meta data stream (immediately following the H1 header) into the data buffer 140 provided by the storage management system 120. Then, the H2 header is read to figure out where the next meta data insertion point is. The data deduplication system 130 switches over to the file data stream and fills the data buffer 140 starting at byte 1000 (0-based) with data from this file data stream until running out of data, filling the buffer, or reaching the next meta data insertion point. So, just as the data buffer 140 was handed to the data deduplication system 130 as a single 256K chunk with co-mingled file data and meta data, the data deduplication system 130 returns the same commingled data to the storage management system 120.

FIG. 6 illustrates pseudocode 600 for retrieving data in accordance with certain embodiments. FIG. 7 illustrates pseudocode for global functions UpdateMetaInfo, nextMetaOffset, and nextMetaLength in accordance with certain embodiments. FIGS. 6 and 7 provide further detail for the processing of FIG. 5 in accordance with certain embodiments.

Thus, with embodiments, the original stream of data (where meta data and file data are co-mingled) is reassembled. The pseudocode of FIG. 6 does not specifically show the logic of reading from a deduplicated object. However, in the loop starting at line 610, after a comment "Read file data", embodiments determine whether a chunk of file data exists in the file data file, or, whether the chunk was removed for deduplication and the location of the chunk (using the reconstruction structure).

Thus, embodiments enable the separation of the meta data from the file data, so that the file data can be deduplicated more efficiently. Certain embodiments provide data deduplication efficiency when storing data into "appliance"-like deduplicators. The term appliance is used for a hardware based entity that is generally more than hardware. For example, some vendors have a deduplication "appliance" that looks like a big hard drive. Data may be stored into the deduplication appliance as though the appliance is a hard drive, but there is software in the appliance that is doing deduplication or encryption or some other desired function. Appliances usually conform to a pre-existing interface (e.g., appliances look like a hard drive and have the same input parameters that a normal hard drive would have). So, appliances offer a transparent function.

Embodiments physically separate the meta data from the file data so that file data can be de-duplicated as a large continuous stream of bytes to maximize deduplication efficiency. Embodiments create a meta data file to keep meta data separate from file data. With embodiments, the meta data file contains information about where the meta data fits into the file data so that the meta data can be re-inserted during data retrieval. In particular, embodiments provide headers ("header information") indicating a position in the file data and then corresponding meta data is to be inserted). In certain embodiments, the header information is tracked in a separate database table.

With embodiments, the file data is no longer segmented by the meta data or by meta data boundaries. With embodiments, the information when writing the data to disk is a breakout of what is meta data and what is file data Embodiments maintain a reconstruction table (for deduplicated objects) of file data chunks. Embodiments provide a technique for re-assembling the original stream of data (where meta data and file data are co-mingled). Thus, embodiments provide two levels of reconstruction.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may comprise a receiver or transmitter device or other physical carrier capable of processing or implementing the code as "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 2, 3, and 5 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 2, 3, and 5 may be implemented in software, hardware, programmable and non-programmable gate array logic or in some combination of hardware, software, or gate array logic.

Figure 8:
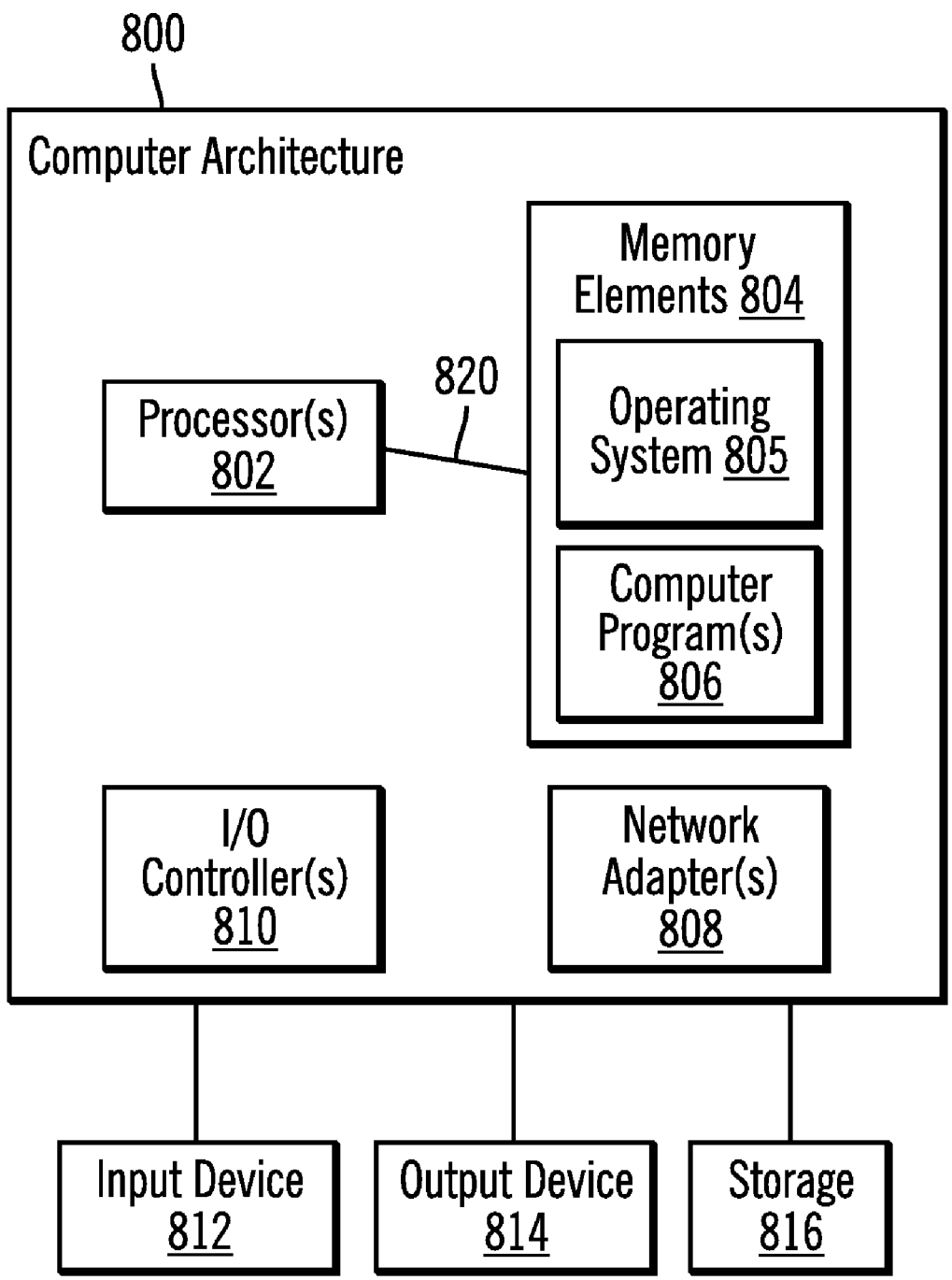
FIG. 8 illustrates a system architecture that may be used in accordance with certain embodiments.

FIG. 8 illustrates a system architecture 800 that may be used in accordance with certain embodiments. Client computer 100 and/or storage management system 120 may implement system architecture 800. The system architecture 800 is suitable for storing and/or executing program code and includes at least one processor 802 coupled directly or indirectly to memory elements 804 through a system bus 820. The memory elements 804 may include local memory employed during actual execution of the program code, bulk storage, and cache memories which provide temporary storage of at least some program code in order to reduce the number of times code must be retrieved from bulk storage during execution. The memory elements 804 include an operating system 805 and one or more computer programs 806.

Input/Output (I/O) devices 812, 814 (including but not limited to keyboards, displays, pointing devices, etc.) may be coupled to the system either directly or through intervening I/O controllers 810.

Network adapters 808 may also be coupled to the system to enable the data processing system to become coupled to other data processing systems or remote printers or storage devices through intervening private or public networks. Modems, cable modem and Ethernet cards are just a few of the currently available types of network adapters 808.

The system architecture 800 may be coupled to storage 816 (e.g., a non-volatile storage area, such as magnetic disk drives, optical disk drives, a tape drive, etc.). The storage 816 may comprise an internal storage device or an attached or network accessible storage. Computer programs 806 in storage 816 may be loaded into the memory elements 804 and executed by a processor 802 in a manner known in the art.

The system architecture 800 may include fewer components than illustrated, additional components not illustrated herein, or some combination of the components illustrated and additional components. The system architecture 800 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A method, comprising:
   receiving, using a processor of a computer, file data in a first file and meta data in a second file, wherein the second file contains information about where the meta data fits into the file data for use in re-inserting the meta data into the file data during data retrieval;
   deduplicating the file data in the first file without deduplicating the meta data in the second file; and
   in response to receiving a request for chunks of data comprised of co-mingled data having file data and meta data inserted into the file data, performing two levels of reconstruction by:
      reconstructing a deduplicated file at a first level; and
      re-inserting the meta data into the file data at a second level; and
      returning the chunks of co-mingled data.

2. The method of claim 1, further comprising:
   storing header information with each portion of meta data, wherein the header information includes an offset into the file data at which the meta data is to be inserted.

3. The method of claim 2, further comprising:
   reassembling a chunk of data by:
      alternatively reading the meta data and the file data based on the header information stored with the meta data; and
      streaming the meta data and the file data to a data buffer, wherein the meta data is inserted into the file data at the offset indicated by the header information associated with the meta data.

4. The method of claim 1, wherein reconstructing the deduplicated file further comprises:
   reading the file data into a data buffer while reassembling the file data that was previously deduplicated using a reconstruction structure to put together the chunks of the file data stream.

5. The method of claim 4, wherein the reconstruction structure comprises a table that includes a column for file names and a column for chunks of files and locations of those chunks.

6. A computer program product comprising a computer-readable medium including computer readable instructions, wherein the computer readable instructions, when executed by a processor on a computer, causes the computer to:
   receive file data in a first file and meta data in a second file, wherein the second file contains information about where the meta data fits into the file data for use in re-inserting the meta data into the file data during data retrieval;
   deduplicate the file data in the first file without deduplicating the meta data in the second file; and
   in response to receiving a request for chunks of data comprised of co-mingled data having file data and meta data inserted into the file data, perform two levels of reconstruction by:
      reconstructing a deduplicated file at a first level; and
      re-inserting the meta data into the file data at a second level; and
      returning the chunks of co-mingled data.

7. The computer program product of claim 6, wherein the computer readable instructions, when executed by the processor on the computer, causes the computer to:
   store header information with each portion of meta data, wherein the header information includes an offset into the file data at which the meta data is to be inserted.

8. The computer program product of claim 7, wherein the header information includes an offset into the file data at which the meta data is to be inserted and wherein the computer readable instructions, when executed by the processor on the computer, causes the computer to:
   reassemble a chunk of data by:
      alternatively reading the meta data and the file data based on the header information stored with the meta data; and
      streaming the meta data and the file data to a data buffer, wherein the meta data is inserted into the file data at the offset indicated by the header information associated with the meta data.

9. The computer program product of claim 6, wherein, when reconstructing the deduplicated file, the computer readable instructions, when executed by the processor on the computer, causes the computer to:
   reading the file data into a data buffer while reassembling the file data that was previously deduplicated using a reconstruction structure to put together the chunks of the file data stream.

10. The computer program product of claim 9, wherein the reconstruction structure comprises a table that includes a column for file names and a column for chunks of files and locations of those chunks.

11. A computer system, comprising:
    a processor; and
    a storage device coupled to the processor, wherein the storage device has stored thereon a program, and wherein the processor is configured to execute the program to perform operations, wherein the operations comprise:
       receiving file data in a first file and meta data in a second file, wherein the second file contains information about where the meta data fits into the file data for use in re-inserting the meta data into the file data during data retrieval; and
       deduplicating the file data in the first file without deduplicating the meta data in the second file; and
       in response to receiving a request for chunks of data comprised of co-mingled data having file data and meta data inserted into the file data, performing two levels of reconstruction by:
          reconstructing a deduplicated file at a first level; and
          re-inserting the meta data into the file data at a second level; and returning the chunks of co-mingled data.

12. The system of claim 11, wherein the operations further comprise:
    storing header information with each portion of meta data, wherein the header information includes an offset into the file data at which the meta data is to be inserted.

13. The system of claim 12, wherein the header information includes an offset into the file data at which the meta data is to be inserted and wherein the operations further comprise:
reassembling a chunk of data by:
alternatively reading the meta data and the file data based on the header information stored with the meta data; and
streaming the meta data and the file data to a data buffer, wherein the meta data is inserted into the file data at the offset indicated by the header information associated with the meta data.

14. The system of claim 11, wherein the operations further comprise:
reading the file data into a data buffer while reassembling the file data that was previously deduplicated using a reconstruction structure to put together the chunks of the file data stream.

15. The system of claim 14, wherein the reconstruction structure comprises a table that includes a column for file names and a column for chunks of files and locations of those chunks.

* * * * *